United States Patent
Elliott

(10) Patent No.: US 6,763,409 B1
(45) Date of Patent: Jul. 13, 2004

(54) SWITCH-ON-THE-FLY GBIC DISK CHANNEL ADAPTER AND DISK CHANNEL SYSTEM

(75) Inventor: Stephen J. Elliott, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 466 days.

(21) Appl. No.: 09/775,233

(22) Filed: Jan. 31, 2001

(51) Int. Cl.$^7$ .............................................. G06F 13/10
(52) U.S. Cl. ............................... 710/74; 710/2; 710/62; 710/72
(58) Field of Search ............................... 369/13–15, 85; 709/230; 710/8, 11, 36, 38, 62, 72, 74, 2, 300, 301; 711/111, 112, 114, 4, 162; 714/6

(56) References Cited

U.S. PATENT DOCUMENTS

| | | | | |
|---|---|---|---|---|
| 5,696,934 A | * | 12/1997 | Jacobson et al. | 714/5 |
| 6,016,527 A | * | 1/2000 | DeMoss | 710/117 |
| 6,112,276 A | * | 8/2000 | Hunt et al. | 711/112 |
| 6,356,984 B1 | * | 3/2002 | Day et al. | 711/147 |
| 6,360,037 B1 | * | 3/2002 | Riza | 385/22 |
| 6,366,471 B1 | * | 4/2002 | Edwards et al. | 361/796 |
| 6,446,141 B1 | * | 9/2002 | Nolan et al. | 710/8 |
| 6,477,139 B1 | * | 11/2002 | Anderson et al. | 370/216 |
| 6,542,954 B1 | * | 4/2003 | Aruga | 710/316 |
| 2002/0004883 A1 | * | 1/2002 | Nguyen et al. | 711/111 |

* cited by examiner

Primary Examiner—Ilwoo Park

(57) ABSTRACT

The present invention relates to a general purpose interface to a Fibre Channel array controller, more particularly to a gigabit interface converter (GBIC) or a gigabit link module (GLM) channel adapter, and to the use of a channel controller with associated general GBIC/GLM adapters to provide an ultra-high bandwidth bus. Specifically, the present invention provides an array controller. The array controller through programmable functionality causes a plurality of devices to appear as a single device. Moreover, the array controller provides a plurality of general purpose interfaces to allow connection of a plurality of heterogeneous devices. Thus, the present invention may allow an integrated storage system comprising disk drives, tape-units, CD-ROMs, optical drives, and/or the like. Alternatively, the array controller may be programmed to implement bus protocols. Thereby, the array controller may provide an ultra-high bandwidth bus by utilizing Fibre Channel connections and optical interfaces for connected devices.

8 Claims, 4 Drawing Sheets

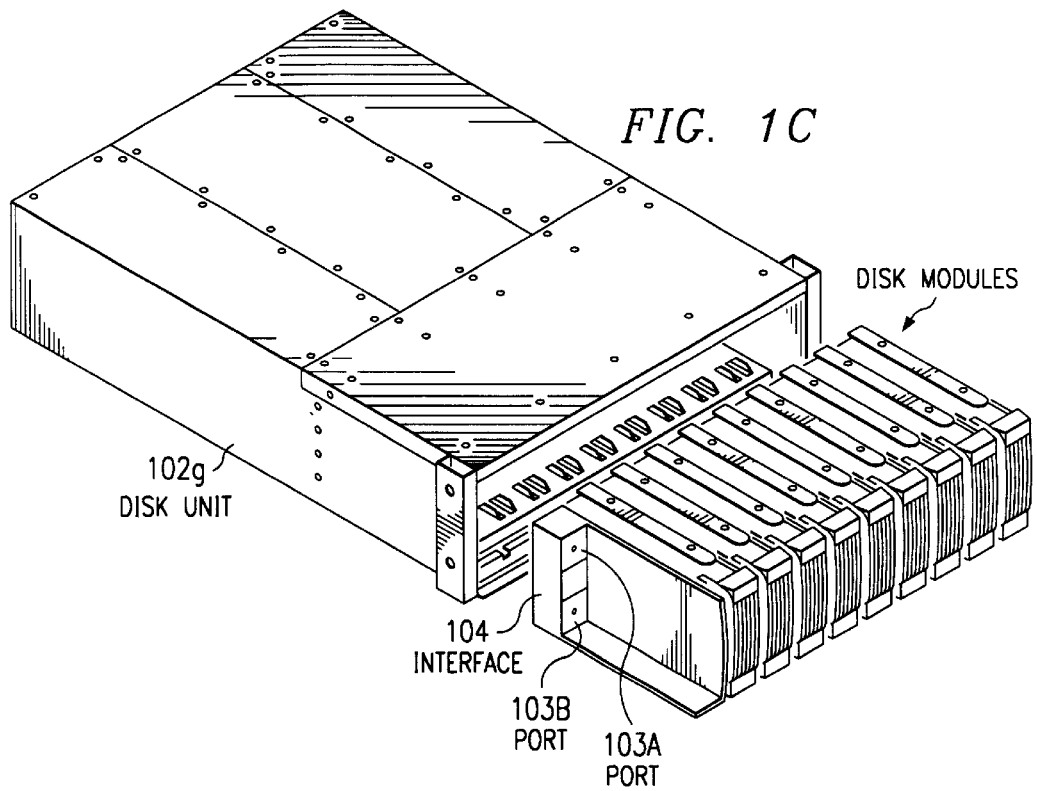
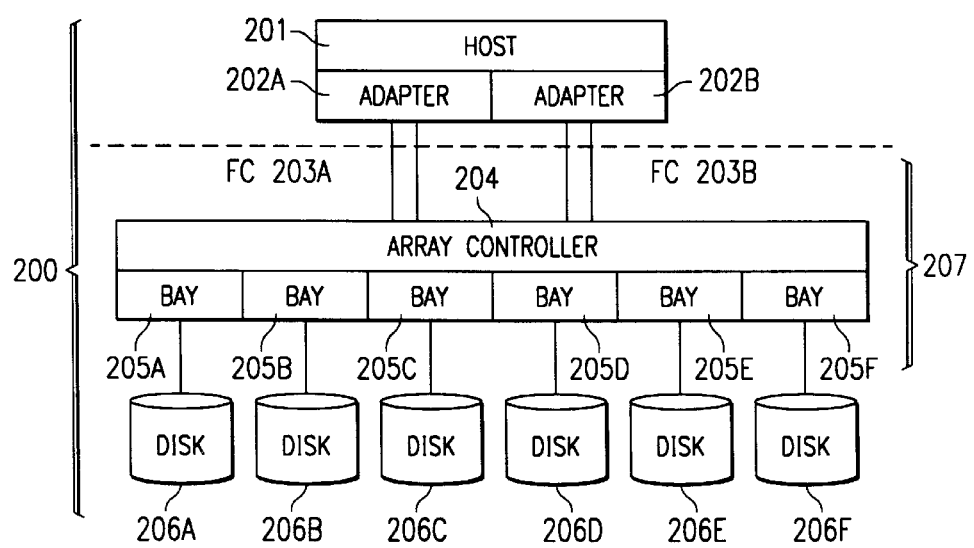

SWITCH-ON-THE-FLY GBIC DISK CHANNEL ADAPTER AND DISK CHANNEL SYSTEM

RELATED APPLICATIONS

The present invention is related to co-pending and commonly assigned U.S. patent application Ser. No. 09/775,213, now U.S. Pat. No. 6,560,673 entitled "NEW FIBRE-CHANNEL UPGRADE PATH," the disclosure of which is incorporated herein by reference.

TECHNICAL FIELD

The present invention relates to a general purpose interface to a Fibre Channel array controller, more particularly to a gigabit interface converter (GBIC) or a gigabit link module (GLM) channel adapter, and to the use of a channel controller with associated general GBIC/GLM adapters to provide an ultra-high bandwidth bus.

BACKGROUND

Enterprise resource planning systems and other sophisticated corporate data processing systems have gained substantial importance in recent years. Specifically, many corporate management theories posit that the success of an organization is directly related to the ability to gather and process enterprise information in an efficient and organized manner. To fulfill these goals, certain software companies have produced information management products such as RP/3 and the like. These types of software systems manage enormous amounts of information. Management of inventory levels, customer purchasing information, accounting data, employment information, and various other databases requires significant storage capacity. In addition, e-commerce has placed a premium upon transferring ordinary business operations to electronic work flows, thereby creating further storage capacity requirements. In addition, increased processing speed and capacity places greater demands upon storage resources.

Disk arrays have been designed to address these storage requirements. An exemplary disk array system is described in commonly assigned U.S. Pat. No. 5,392,244, entitled "MEMORY SYSTEMS WITH DATA STORAGE REDUNDANCY MANAGEMENT," the disclosure of which is incorporated herein by reference. In essence, a disk array is a system that utilizes a number of discrete disks and interfaces with a host system or systems in such a manner that the assemblage of discrete disks appears as a single disk system. Disk arrays present numerous advantages. For example, disk arrays are highly redundant. If a particular discrete disk fails, the remaining portion of the disk array remains in operation. Moreover, disk arrays permit data mirroring, i.e. the same data may be stored upon more than one disk to provide greater redundancy against discrete disk failure. Accordingly, the probability of failure of the entire disk array is much lower than integrated storage systems.

Moreover, known disk array systems are designed to operate in a Fibre Channel environment. The Fibre Channel communication protocols are somewhat similar to the well-known Small Computer System Interface (SCSI) scheme, except for several differences. SCSI is a parallel interface standard used by various personal computers for attaching peripheral devices to computers. The Fibre Channel approach utilizes a mapped protocol to communicate frames, instead of individual bytes. Moreover, the Fibre Channel approach does not utilize parallel communication path connections. Instead, the Fibre Channel environments utilize serial communication channels to provide various system architectures, such as point-to-point, arbitrated loop, and crosspoint switched topologies. The serial communication approach simplifies system configuration. Specifically, the in-bound cable for one device in a Fibre Channel environment is the out-bound cable for a preceding device (either another independent unit or a fabric circuit switch). The fiber may comprise either an optical fiber cable or a twin-axial copper cable. For the remaining material, the term "fiber" shall be interchangeably utilized to mean either a fiber optical medium or a twin-axial copper cable. Also, it should be noted that Fibre Channel systems provide very high data communication rates. In fact, gigabit communication rates are possible. Fibre Channel systems rely upon intermediate devices to propagate information accurately between source and destination devices. Since the Fibre Channel architecture utilizes this approach, Fibre Channel systems limit the number of devices that may be present upon the system. This limitation is imposed to reduce latency and improve data communication rates.

Since there is an inherent limitation upon the number of devices present upon a Fibre Channel system, disk arrays operating upon a Fibre Channel system do not connect each individual disk unit to the external Fibre Channel system. Instead, a Fibre Channel disk array integrates the Fibre Channel in-bound and out-bound cables in a backplane. The Fibre Channel disk arrays further comprise a controller unit to arbitrate or manage communication between the discrete disk units and the Fibre Channel environment. The operating principles of an array controller is described in commonly assigned U.S. Pat. No. 5,471,640, entitled "PROGRAMMABLE DISK ARRAY CONTROLLER HAVING N COUNTERS FOR N DISK DRIVES FOR STRIPPING DATA WHERE EACH COUNTER ADDRESSES SPECIFIC MEMORY LOCATION BY A COUNT OF N," the disclosure of which is incorporated herein by reference. The controller unit may provide a predetermined number of disk bays for connecting individual disk units. Thereby, the discrete disk units communicate directly with the controller unit. The controller unit assembles information received via the disk bays from the drives for communication in the forward direction over the fiber channel. Similarly, the controller unit separates data communicated in the reverse direction for distribution to the particular discrete drive units via appropriate disk bays. The controller unit further manages the discrete disk units in a manner that the plurality of units appears as a single disk. The controller unit implements mirroring tasks to provide for greater redundancy. Also, the use of Fibre Channel protocols permits efficient communication of data from discrete disk units to destination devices on the Fibre Channel system. Specifically, Fibre Channel protocols have demonstrated high bandwidth capability for large file transfers.

This architecture is quite useful to provide large storage capacity in an efficient and reliable fashion. However, the architecture of such disk array systems is specifically designed for a single purpose-data storage upon multiple discrete disk units. Moreover, the architecture provides very limited scalability. Specifically, the architecture limits the addition of discrete disk units to a predetermined number. At the present time, additional storage requirements must be fulfilled by providing a separate disk array system which obviously entails substantial expense. Also, the controller unit is singularly designed to interface with discrete disk units via the disk bays. Since the controller unit utilizes a specific interconnect, it is not possible to connect other devices via the disk bays.

SUMMARY OF THE INVENTION

The present invention provides an interface to facilitate a scalable and cost-effective disk array system. By doing so, the present invention simplifies operating system compatibility issues by facilitating scalable data storage. The present invention provides a general purpose interface to permit connection of heterogeneous devices to a Fibre Channel controller via plug-in connections. Also, the present invention facilitates connection of a plurality of heterogenous devices to a Fibre Channel system via a controller in a manner that the plurality of devices appears from a system perspective as a single device. Moreover, the present invention provides a general interface to a Fibre Channel controller to provide an ultra-high speed bus.

The present invention is directed to a general purpose interface to a Fibre Channel controller. The system provides a dual or greater slot interface to a single bay of a fiber channel system. The interface may preferably comprise two slots utilizing either a gigabit interface converter (GBIC) or a gigabit link module (GLM) for both slots. By providing a plurality of slots, the present invention permits scalable addition of devices to the Fibre Channel controller. The interface does not simply double the interface capacity of the Fibre Channel controller. Instead, individual interfaces may be serially connected. Thus, the interfaces permit exponential expansion of capacity to a single port of the Fibre Channel controller. Moreover, the present invention permits connection of heterogenous devices to the Fibre Channel controller in addition to discrete disk units. For example, the interface may permit connection of CD-ROM drives, tape units, networking cards, optical drives, and/or the like. In alternate embodiments, the present invention allows connection via other interfaces, such as SCSI interfaces, WDM interfaces, RS-232 interfaces, and/or the like.

Also, the present invention realizes that Fibre Channel controllers are not limited to disk array systems. By designing general purpose interfaces to a Fibre Channel controller, the present invention permits a Fibre Channel controller and its fiber channels to serve as an ultra-high speed bus. Specifically, any type of device may be connected to the controller. Thus, Fibre Channel controllers may provide the same capabilities of an ordinary bus with significantly higher bandwidth capability in accordance with the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1C illustrates replacement of a disk array module with an inventive interface.

FIG. 2 illustrates an exemplary disk array system connected to an exterior system.

DETAILED DESCRIPTION

Figure 1A:
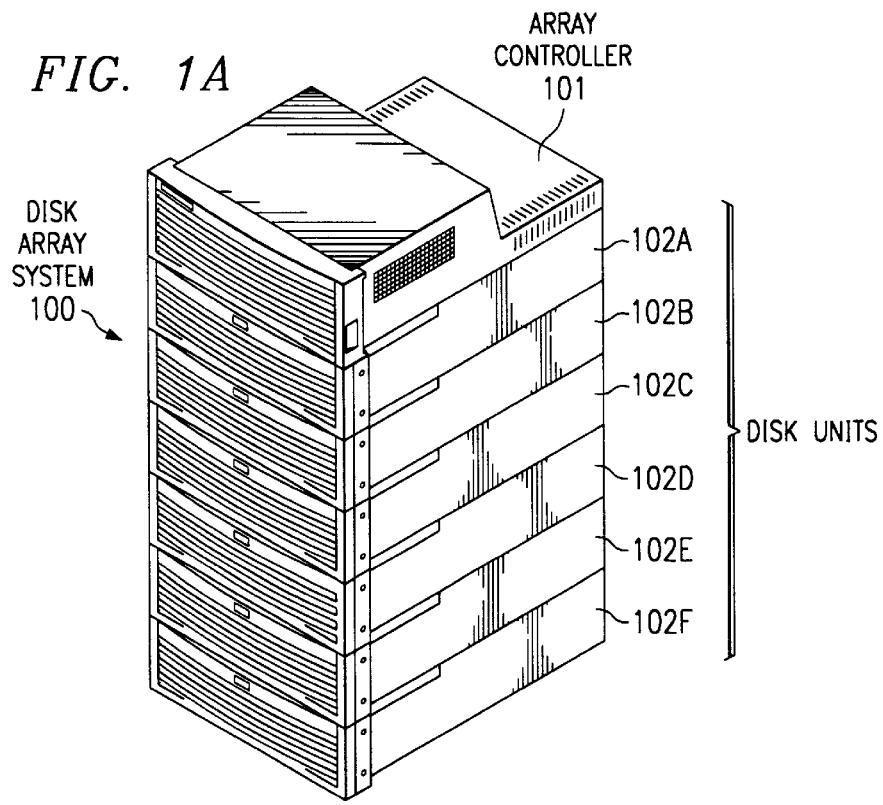
FIG. 1A illustrates an exemplary disk array system.
Figure 1B:
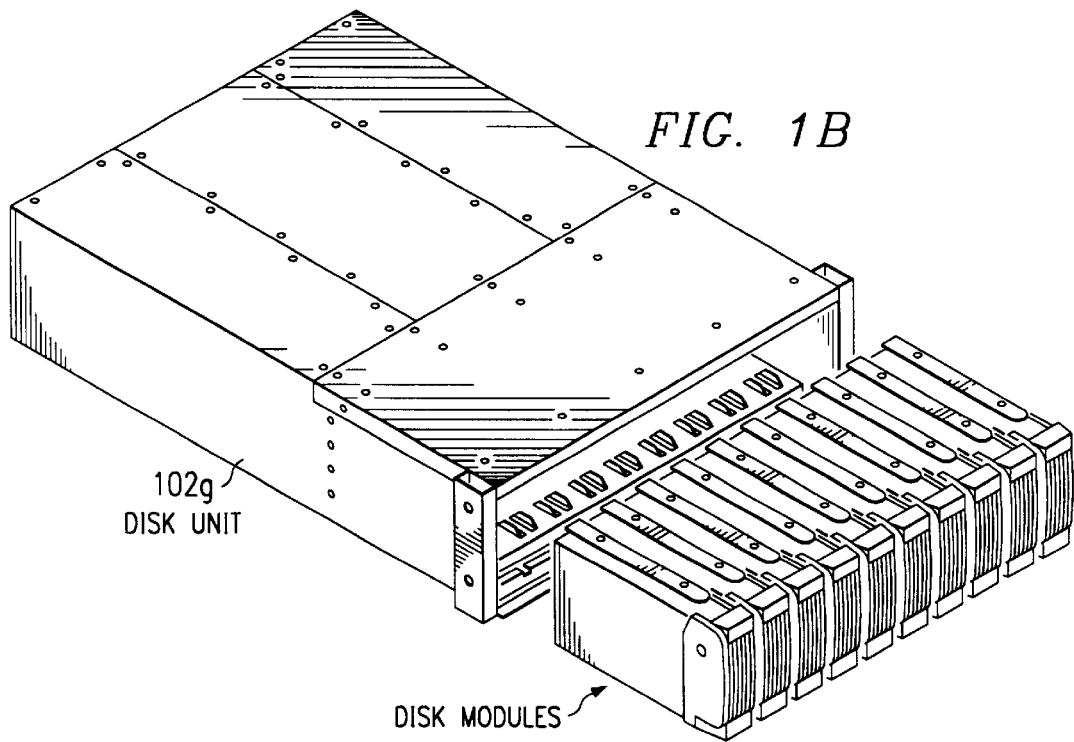
FIG. 1B illustrates plug-in disk modules associated with typical disk array systems.

Turning now to the Drawing, FIG. 1A illustrates a known disk array channel system 100. Disk array system 100 comprises array controller 101 and a plurality of disk units 102A–102F. Also, disk array system 100 comprises dual fiber channels (not shown) to provide a physical medium for communication to another device in a Fibre Channel system. An exemplary configuration of plug-in disk modules is shown in FIG. 1B. FIG. 1B shows single disk unit 102$g$ which includes a plurality of disk modules. The disk modules are added to single disk unit 102$g$ by simply plugging into the various pre-established ports. FIG. 1C illustrates the operation of the present invention. FIG. 1C shows disk unit 102$g$. As previously discussed, disk unit 102$g$ comprises a plurality of disk modules. However, one of the disk modules is replaced by an inventive interface in FIG. 1C. Interface 104 plugs into disk unit 102$g$ in a manner similar to the plug-in functionality of the disk modules. Additionally, interface 104 includes ports 103A and 103B to allow the connection of general purpose devices to disk unit 102$g$ as will discussed in greater detail below.

FIG. 2 illustrates a block diagram of system 200 utilizing such a disk array system. System 200 comprises host 201. Host 201 communicates through adapters 202A and 202B to disk array system 207. It shall be appreciated that this exemplary configuration represents a single link on a Fibre Channel system. As shown, host 201 represents a single data processing system in a point-to-point topology. However, the present invention may be practiced within any system topology. For example, host 201 and disk array system 207 may be connected to other devices to form the arbitrated loop topology. Also, host 201 may represent a circuit switch in a fabric topology. However, disk array system 207 is merely shown connected to host 201 in a point-to-point topology for the sake of simplicity.

Disk array system 207 communicates over the physical connections provided by fiber channels 203A and 203B. Disk array system 207 utilizes one fiber to transmit information to host 201. Disk array system 207 utilizes the other fiber to receive information from host 201.

Additionally, disk array system 207 comprises array controller 204. Array controller 204 comprises a plurality of disk bays 205A–205F. Of course, the number of disk bays is not strictly limited to a particular number for design purposes. Nonetheless, manufactured disk array systems do not permit the addition of more disk bays without substantial modifications. Disk bays 205A–205F provide the interconnect to a corresponding number of disk units 206A–206F. Disk array system 207 performs a number of functions. In particular, disk array system performs bandwidth conversion. Specifically, individual disks 206A–206F may communicate at a lower communicate rate than the fiber channel depending upon the interface type and the drive capabilities. Disk controller 204 receives information from disks 206A–206F and assembles received information into a higher bandwidth signal for transmission to host 201. Likewise, disk controller 204 receives information from host 201 and distributes the information via lower bandwidth links to disks 206A–206F. Disk controller 204 is preferably implemented as a high-speed processor based device. Moreover, disk controller 204 may further comprise a significant buffer to increase system performance.

In this manner, disk array system 207 provide a "virtual disk" comprising substantial storage capacity. Disk array system 207 appears from the perspective of host 201 to be a single disk drive. Since disk array system 207 has a disk unit associated with each disk bay, disk array system 207 does not provide any capacity to provide additional storage. Thus, network managers must provide an additional disk array or other storage medium to satisfy any outstanding storage requirements.

Figure 4A:
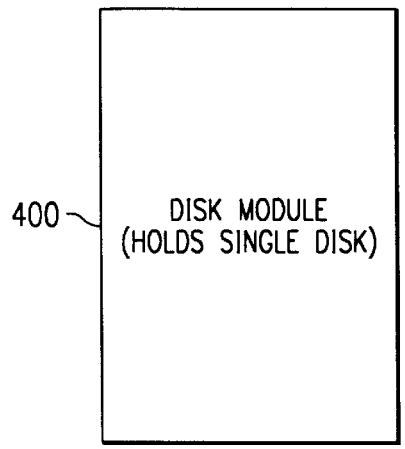
FIG. 4A illustrates an exemplary disk bay utilized with a controller of a disk array system.
Figure 4B:
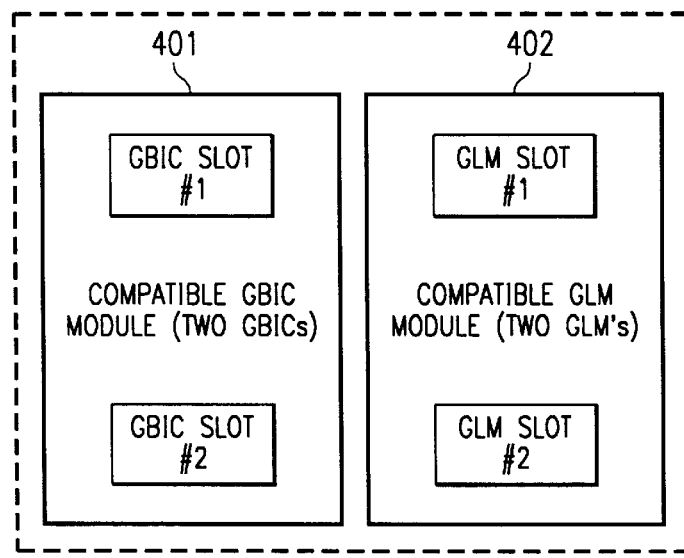
FIG. 4B illustrate exemplary expansion interfaces utilized with a controller.
Figure 4C:
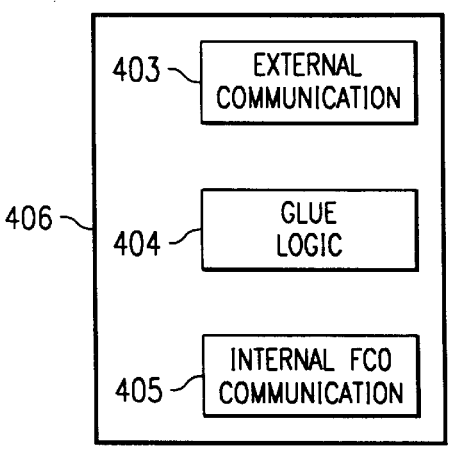
FIG. 4C illustrates exemplary processing hardware disposed on a port of an exemplary expansion interface port.

FIG. 4A illustrates disk module 400 which is a block representation utilized in known disk array systems. The pertinent characteristic of disk module 400 is that it only provides an interface to an array controller for a single disk. It is not possible to connect several disks. Also, it is not possible to connect any other type of device. In contrast, FIGS. 4B and 4C illustrate exemplary inventive interfaces. FIG. 4B illustrates GBIC based adapter 401. GBIC interface 401 comprises two slots with each slot providing a single GBIC transceiver. A GBIC is an industry standard modular transceiver solution for gigabit Ethernet applications. GBICs utilize optical signaling to provide the gigabit interface. Each GBIC slot may be utilized to communicate with any type of device as will be discussed in greater detail herein below. Similarly, FIG. 4C illustrates GLM based adapter 402. GLM adapter 402 comprises two slots with each slot providing a GLM interface. A GLM interface is substantially similar to a GBIC except that are GLMs are fixed to boards and GBICs provide plug-in functionality. In a preferred embodiment, the GBIC and/or GLM interfaces are designed so that the modules may simply slide into existing disk array units. This is particularly advantageous, since it allows the present invention to be utilized with existing hardware devices.

Although FIGS. 4B and 4C illustrate the use of GBICs and GLMs in connection with the present invention, it shall be appreciated that any type of interface may be created. For example, wave division multiplexing modules, SCSI interfaces, Ethernet interfaces, and/or the like may be utilized. However, GBICs and GLMs are preferred embodiments due to their expense, complexity, reliability, and bandwidth characteristics. Moreover, it shall be appreciated that it is not necessary to utilize the same type of interfaces on a single interface unit. The two ports may possess differing bandwidths. Alternatively, the two ports may possess differing transmission characteristics as one may be optical and the other may be electrical. Thus, the present invention may be practiced utilizing any number of interface types.

FIG. 4C illustrates an exemplary block diagram of signal processing components disposed behind an individual port of an inventive interface. First, block 406 may comprise an external communication 403 sub-component. External comm. 403 may manage the communication with the given physical interface of the port. For example, external comm. 403 may interchange optical signals associated with the port with electrical signals received from glue logic 404. Glue logic describes the functionality utilized to manage communication between two different communication protocols and/or mechanisms such as external communication external comm. 403 and internal FC0 communication sub-component 405. Glue logic 404 may provide data rate translation, buffering, and/or protocol translation tasks. In particular, glue logic 404 may preferably comprise sufficient programmable instructions to allow a connected device to be compatible with an ordinary disk drive port associated with a disk array. Glue logic 404 may be implemented in any number of ways. For example, glue logic 404 may be implemented via ASIC design. Alternatively, glue logic 404 may be implemented utilizing a microprocessor, memory, EEPROM, and/or the like. Also, block 406 preferably comprises internal FC0 communication sub-component 405. FC0 comm. 405 provides communication capabilities to and from the controller unit of the array. Fibre Channel connections and protocols are preferably utilized to communicate internally within the disk array for several reasons. First, they provide very high bandwidth communication. Secondly, Fibre Channel protocols provide a number of bandwidth allocation mechanisms that are relatively flexible and efficient, thereby allowing simplified management of data access to the various connected devices. It shall be appreciated that this is a separate Fibre Channel arbitrated loop than the external Fibre Channel connections. Thus, FC0 comm. 405 is preferably associated with a separate and distinct Fibre Channel arbitrated loop that provides communication within the disk array, thereby allowing communication between the controller and the various devices.

The present invention allows chaining of multiple interfaces to provide an exponential expansion path. For example, each slot of GBIC adapter 401 or GLM adapter 402 may be connected to a similar port. Thus, the second port connects two optical slots to one optical slot of the original interface. This process may be iteratively continued as necessary. It shall be appreciated that the process of exponentially expanding via a single slot may cause the bandwidth of the connected interfaces to exceed the capacity of the single slot connected to the controller unit. In this situation, all devices cannot communicate at the same time. Accordingly, a scheme should be employed to provide some sort of time division access. The present invention provides another advantage by simplifying this arrangement. The present invention may utilize the "carrier sense" functionality of gigabit Ethernet devices. The "carrier sense" functionality of Ethernet devices provides a medium access control (MAC) scheme. The MAC scheme prevents other devices from attempting to communicate over an optical channel if another device is already communicating. Thus, the present invention may leverage existing gigabit Ethernet protocols to prevent connected devices from exceeding the bandwidth of the controller unit.

In additional, various interfaces may be connected to the GBICs or GLMs. In an embodiment, a secondary adapter card may be attached to a GBIC or GLM interface. In turn, the adapter card permits connection of multiple ordinary SCSI bus channels via a single GBIC or GLM transceiver. By doing so, the aggregate bandwidth requirement of the plurality of SCSI channels may match the bandwidth of the GBIC/GLM port. In a preferred embodiment, a controller may comprise fifteen interface GBIC/GLM ports. Four SCSI channels may be connected via a single secondary adapter card to specific GBIC/GLM transceiver. Moreover, fifteen disk drives may be connected to each SCSI channel. This embodiment may be practiced with ten gigabyte drives. Thus, the present invention by utilizing a controller with high bandwidth fibers and interfaces may provide 9000 gigabytes of data storage capacity. In addition, the present invention allows this scope of data storage to be implemented in a much more compact solution than achievable by prior storage configurations.

Figure 3:
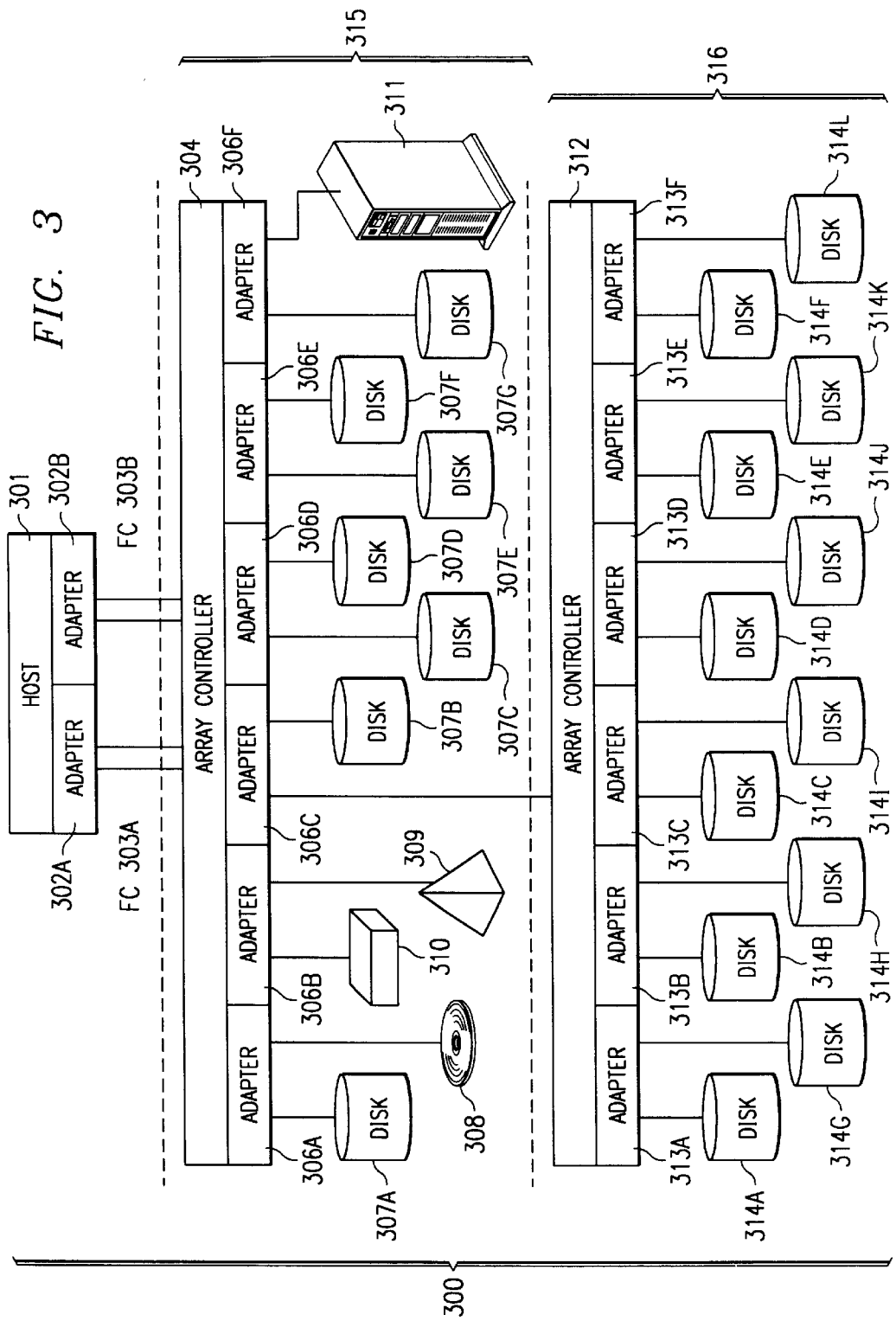
FIG. 3 illustrates an exemplary fiber channel system connected to an exterior system with the controller connected to diverse hardware units.

FIG. 3 illustrates exemplary system 300. System 300 comprises host 301 with adapters 302A and 302B. As previously noted, system 300 represents a point-to-point topology in a Fibre Channel system. However, the present example utilizes one system for the sake of simplicity. Host 301 communicates using adapters 302A, 302B which are coupled to fiber channels 303A and 303B. Fiber channels 303A and 303B are connected to array controller 304. In this case, array controller 304 utilizes inventive adapters 306A–306F to provide connection to a heterogeneous set of devices. Similar to the previous configuration, array controller 304 is connected to a plurality of disk units (307A–307G). In addition, controller 304 is connected to CD-ROM 308, tape-unit 310, and optical reader/writer 309. The inventive interface even permits array controller 304 to connect to other networks. In this case, array controller 304 is connected to ATM switch 311.

It is a further advantage of the present invention to provide simplified back-up and debugging capabilities. For example, the controller unit may automatically cause certain data stored on disk units to be stored via a tape-unit for back-up purposes. Thus, back-up functionality may occur without the intervention of IT personnel or other system operations. Also, the back-up operation may occur without transferring data over network connections. Instead, the back-up data transfers may occur solely within the controller unit. Also, the present invention permits back-ups to another disk array system or disk drive without requiring disconnection of the original disk array. This is especially useful for diagnosis of CPE hardware bugs, since a virtual copy may be created and sent back to a lab for analysis.

As previously noted, the present invention allows scalability of storage capacity. This may be accomplished by connecting array controller 304 to another array controller (array controller 312). Additionally or alternatively, the present invention may be employed in a hierarchical storage architecture as described in commonly assigned and co-pending U.S. patent application Ser. No. 09/775,213, filed Jan. 31, 2001 (issued as U.S. Pat. No. 6,560,673), entitled "NEW FIBRE-CHANNEL UPGRADE PATH." Array controller 312 is connected to a plurality of devices via inventive adapters 313A–313F. In this case, array controller 312 is connected to disk units 314A–314L. It shall be appreciated that array controller 312 may also connect to any number of diverse devices or even to another array controller.

Thus, the present invention provides a technically simplified mechanism to increase storage capacity. The present invention provides numerous advantage over other solutions. First, the assemblage of storage devices on array controller 304 and array controller 312 appears to host 301 as a single "virtual" storage system. When array controller 312 and associated disk units 314A–314L are initially connected to array controller 304, the system architecture from the viewpoint of host 301 has not changed. Host 301 simply detects that additional storage capacity exists via its connection to array controller 304. Host 301 is not required to have any greater knowledge of devices disposed at lower levels, such as array controller 312.

The present invention also simplifies operating systems tasks. For example, known Fibre Channel systems connect the heterogenous devices disposed on the systems to processor units via hubs or switches. However, this solution is problematic since each processor unit's operating system must be configured to operate with each device. This is especially problematic given the inclination of operating system providers to use proprietary application interfaces. Configuration of devices and associated debugging may be exceptionally cumbersome. Thus, the present invention simplifies operating system issues, since each processor system need only be configured to the controller. The present invention reduces the necessity of training and retaining dedicated IT personnel to maintain and optimize communication with a plurality of data storage related devices.

Moreover, the present invention realizes that the disk array controller architecture is not limited to disk applications. Instead, the present invention realizes that the disk array controller architecture may be utilized to make any assemblage of devices to appear to a host system or other network to be achieved as a single connection. Custom controllers may be developed for other applications. For example, a controller may be configured or programmed to act as a bus. Such an application may provide extremely high performance as compared to ordinary buses. In fact, the use of GBIC or GLM interfaces and the fiber channels allows implementation of a gigabit bus.

FIG. 3 illustrates a system configuration that illustrates the potential of this concept. Host 301 is connected to array controller 304 via fiber connections 303A and 303B. Array controller 304 manages or arbitrates communication between host 301 and all of the associated devices. In essence, array controller 304 may serve as a protocol and physical interconnect between host 301 and the various devices. Array controller 304 provides several mechanisms to provide the protocol and physical interconnections. First, array controller 304 receives the high bandwidth Fibre Channel signal via an incoming fiber. Array controller 304 determines which information is intended for particular devices. Array controller 304 may determine which information is intended for which device utilizing typical bus protocols. For example, certain messages or packets may comprise a device address to identify the destination device.

Also, array controller 304 may perform bandwidth conversion as necessary. For example, array controller 304 may buffer received information as necessary. When bandwidth to the particular devices is available, array controller 304 communicates the information to the particular devices via the respective adapters. Similarly, array controller 304 receives information from devices via the respective adapters. Array controller 304 may buffer the information as necessary. Additionally, it shall be appreciated that array controller 304 may preferably arbitrate or control the receipt of information from the devices. First, two devices utilizing the same adapter may otherwise attempt to communicate via the same adapter at the same time. However, the bandwidth of the combined devices may exceed the bandwidth of the interface. Also, the aggregate bandwidth of the devices may exceed the bandwidth of the outgoing fiber channel. Array controller 304 may buffer information. However, the buffer may eventually be exceeded before the buffer is emptied by transmitting via the outgoing fiber. Accordingly, array controller 304 may control or arbitrate communication to/from the devices to prevent the bandwidth of any particular channel from being exceeded.

Thus, array controller 304 may provide the bus functionality of providing multi-channel access to a number of heterogeneous devices. In addition, it shall be appreciated that the devices are not limited to storage devices. Array controller 304 may connect to any device, such as interface cards connected to other networks. Also, the present invention permits these types of hardware solutions to be implemented in a scalable manner. For example, the exemplary bus may be expanded with little difficulty by applying another array controller associated with a new set of devices. This scalable expansion may occur without affecting the view of the bus to the connected host system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system, comprising:
   an array controller for managing a plurality of storage devices to appear as a single storage device on a communication network, wherein said array controller communicates with said plurality of storage devices using a first communication protocol;
   a housing for receiving said plurality of storage devices in fixed bays;
   an internal communication bus for communication between said plurality of storage devices and said array controller, wherein each of said fixed bays of said housing comprise an electrical interface for coupling a respective storage device to said internal communication bus;
   at least one interface adapter received within one of said fixed bays and coupled to a respective electrical interface, wherein said at least one adapter interface comprises a plurality of optical interfaces to communicate with storage devices according to a second communication protocol and is operable to arbitrate and translate storage device data received by said plurality of optical interfaces for communication using said respective electrical interface; and
   another interface adapter coupled to an optical interface of said at least one interface adapter, wherein said another interface adapter comprises a plurality of electrical interfaces to communicate with storage devices, wherein said plurality of electrical interfaces of said another interface adapter are SCSI channels.

2. The system of claim 1 wherein said plurality of optical interfaces are gigabit interface converters.

3. The system of claim 1 wherein said plurality of optical interfaces are gigabit link module channel adapters.

4. The system of claim 1 further comprising:
   another array controller for managing a plurality of storage devices that is coupled to an optical interface of said at least one interface adapter.

5. The system of claim 1 wherein multiple individual disk drive devices are inserted within respective bays, a tape storage peripheral is coupled to one of said optical interfaces of said at least one interface adapter, and said array controller is operable to create an image of data stored on said multiple disk drive devices on said tape storage peripheral.

6. The system of claim 1 wherein said internal communication bus is a Fibre Channel loop.

7. A method of operating a storage system, comprising:
   providing a plurality of storage peripherals to a plurality of fixed bays of said storage system;
   coupling each of said plurality of fixed bays to an internal communication bus of said storage system;
   operating an array controller, coupled to said internal communication bus, to control said plurality of storage peripherals according to a first communication protocol;
   providing an interface adapter, having a plurality of optical interfaces, to one of said plurality of fixed bays, wherein said interface adapter communicates with said array controller via said internal communication bus according to said first protocol and communicates with storage peripherals via said plurality of optical interfaces according to a second communication protocol, wherein said interface adapter arbitrates and translates storage device data between said internal communication bus and said plurality of optical interfaces; and
   coupling another interface adapter to one of said plurality of optical interfaces, wherein said another interface adapter comprises multiple electrical interfaces for communication with a plurality of storage peripherals, wherein said multiple electrical interfaces of said another interface adapter are SCSI interfaces.

8. The method of claim 7, further comprising:
   coupling a back-up storage peripheral to said interface adapter; and
   creating an image of said plurality of storage peripherals on said back-up storage peripheral.

* * * * *